United States Patent
Abe et al.

(10) Patent No.: US 7,925,076 B2
(45) Date of Patent: Apr. 12, 2011

(54) INSPECTION APPARATUS USING TEMPLATE MATCHING METHOD USING SIMILARITY DISTRIBUTION

(75) Inventors: Yuichi Abe, Mito (JP); Mitsuji Ikeda, Hitachinaka (JP); Yoshimichi Satou, Hitachi (JP); Yasutaka Toyoda, Hitachi (JP)

(73) Assignee: Hitachi High-Technologies Corporation, Tokyo (JP)

( * ) Notice: Subject to any disclaimer, the term of this patent is extended or adjusted under 35 U.S.C. 154(b) by 915 days.

(21) Appl. No.: 11/836,452

(22) Filed: Aug. 9, 2007

(65) Prior Publication Data

US 2008/0069453 A1 Mar. 20, 2008

(30) Foreign Application Priority Data

Sep. 5, 2006 (JP) ................................. 2006-240375

(51) Int. Cl.
*G06K 9/00* (2006.01)
(52) U.S. Cl. ........................................................ 382/151
(58) Field of Classification Search .................. 382/151
See application file for complete search history.

(56) References Cited

U.S. PATENT DOCUMENTS 5,640,200 A * 6/1997 Michael ........................... 348/87
7,082,225 B2 * 7/2006 Endo et al. ..................... 382/291
2005/0074160 A1 * 4/2005 Miyashita ..................... 382/151
2005/0281454 A1 * 12/2005 Miyashita ..................... 382/145
2007/0133863 A1 * 6/2007 Sakai et al. ................... 382/151

FOREIGN PATENT DOCUMENTS

JP 61-98483 A 5/1986
JP 2003-85566 A 3/2003

* cited by examiner

Primary Examiner — Brian P Werner
(74) Attorney, Agent, or Firm — Crowell & Moring LLP

(57) ABSTRACT

An inspection apparatus performing template matching of a search image capable of outputting a correct matching position even if a pattern similar to a template exists in the search image is provided. The inspection apparatus includes a template cutout means for cutting out a template from a template selection image, a marginal similarity calculation means for calculating marginal similarity distribution information, which is a similarity distribution of the template selection image to the template, a search image similarity calculation part for calculating search image similarity distribution information, which is a similarity distribution of the search image to the template, a similarity distribution-to-similarity distribution similarity calculation means for calculating similarity distribution-to-similarity distribution similarity information between the marginal similarity distribution information and the search image similarity distribution information, and a matching position determination part for determining a matching position based on the similarity distribution-to-similarity distribution similarity.

20 Claims, 17 Drawing Sheets

(1) IMAGE WITHOUT BEING ADDED UP (2) IMAGE OBTAINED BY FOUR IMAGES BEING ADDED UP (3) I IMAGE OBTAINED BY 16 IMAGES BEING ADDED UP (1) SEARCH IMAGE (2) TEMPLATE (6) NORMALIZED CORRELATION MAP (3) CORRECT MATCHING POSITION (4) OTHER MATCHING POSITIONS (5) OTHER MATCHING POSITIONS (a) OBJECT (a') OBJECT (b) TEMPLATE SELECTION IMAGE (c) TEMPLATE  (b') SEARCH IMAGE (d) MARGINAL SIMILARITY DISTRIBUTION INFORMATION (d') SEARCH IMAGE SIMILARITY DISTRIBUTION INFORMATION (1) SEARCH IMAGE (2) NORMALIZED CORRELATION MAP OF SEARCH IMAGE (3) TEMPLATE (1) SEARCH IMAGE (2) NORMALIZED CORRELATION MAP OF SEARCH IMAGE

OFFSET (3) TEMPLATE (a) TEMPLATE
    SELECTION IMAGE (b) AMPLITUDE
    SPECTRUM OF (a)

(c) LOG-POLAR
    TRANSFORMATION OF (b)

(a') SEARCH IMAGE (b') AMPLITUDE
     SPECTRUM OF (a')

(c') LOG-POLAR
     TRANSFORMATION OF (b')

INSPECTION APPARATUS USING TEMPLATE MATCHING METHOD USING SIMILARITY DISTRIBUTION

CLAIM OF PRIORITY

The present application claims priority from Japanese application JP2006-240375 filed on Sep. 5, 2006, the content of which is hereby incorporated by reference into this application.

BACKGROUND OF THE INVENTION

1. Field of the Invention

The present invention relates to an inspection apparatus using a template matching method.

2. Description of the Related Art

A technology for searching through a target image for a given specific shape (template) has been widely used as template matching (see Section 8.3 of Digital Picture Processing by Azriel Rosenfeld and Avinash C. Kak). Also, attempts to increase the speed of template matching such as determining matching positions faster by integrating similarities between a template and each of an x-projection and y-projection of a search image as disclosed in Japanese Patent Application Laid-Open No. 2003-85565 and those to make template matching more accurate such as estimating similarities of a search image even with a lot of noise to a template by considering a local similarity distribution as disclosed in Japanese Patent Application Laid-Open No. 61-98483 have been made.

Template matching to determine a measuring position is performed also for measurement of patterns on a semiconductor wafer using a scanning electron microscope. Rough alignment of the measuring position is performed by moving a stage on which the wafer is placed, but only with accuracy of the stage alignment, a gross deviation may be caused on an image photographed under high magnification of the scanning electron microscope. In order to correct the deviation to make measurement at the correct position, template matching is performed. More specifically, by registering unique patterns near a measuring position as a template, relative coordinates of the measuring position viewed from the template are stored. To determine a measuring position from a photographed image, a matching position is determined by performing template matching before moving from the matching position by the relative coordinates to reach the measuring position.

In template matching for a scanning electron microscope, first a measuring position of an object (a) is photographed and a unique pattern contained therein is registered as a template. An image (b) photographed at this point is called a template selection image and a unique pattern (c) selected from the template selection image is called a template. Next, when another object (a') ((a') may be another position having the same pattern on the same wafer as (a), for example, the same portion of a die formed repeatedly on the same wafer, or a position having the same pattern on a different wafer) is photographed, a photographed image is searched for a pattern that matches the template. The photographed image (b') is called a search image. There is a deviation of a positioning error of the stage between the template selection image (b) and the search image (b'). The deviation is corrected by template matching. As a result of template matching, positions with a high degree of similarity to the template become matching position candidates and, among these candidates, a position most suitable as a matching position will be the final matching position. If, for example, the method disclosed in the above Japanese Patent Application Laid-Open No. 61-98483 is used, a distribution of local similarities calculated by subdividing the template is determined for each candidate before determining the final matching position by considering the distribution.

In the above means for performing template matching for a scanning electron microscope, a photographed template selection image is input into a template registration part for registration of a template and then a unique pattern selected manually or automatically is cut out by a template cutout part as a template before being stored. A photographed search image is input into an image search part that searches for a matching position with the template before being checked against the template by a search image similarity calculation part. Search image similarity distribution information showing how a degree of similarity to the template is distributed in the search image is output by the search image similarity calculation part. A matching position determination part determines a matching position based on the search image similarity distribution information. At this point, a point with the highest degree of similarity may simply be selected as a matching position or the method disclosed in Japanese Patent Application Laid-Open No. 61-98483 may be used. When the method disclosed in Japanese Patent Application Laid-Open No. 61-98483 is used, the search image similarity distribution information contains information about local similarities to the subdivided template. If, as disclosed in Japanese Patent Application Laid-Open No. 2003-85565, a similarity distribution between a template and each of an x-projection and y-projection of a search image is held, a matching position can be determined at high speed.

As has been described above, though a conventional template matching technique has devised, for example, a method of estimating similarities of a search image to a template with high accuracy even if the search image contains a lot of noise by considering a local similarity distribution, if there is a pattern similar to the template in the search image, the matching position may be determined erroneously due to an influence of pattern distortion, unevenness in image luminance or the like, leading to an erroneous decision of coordinates of the similar pattern as the matching position.

A subject of the present invention is to provide a template matching method that outputs a correct matching position even if a pattern similar to a template exists in a search image. The present invention also provides an inspection apparatus using thereof.

SUMMARY OF THE INVENTION

To address the above subject, an inspection apparatus performing template matching to a search image according to the present invention includes: a template cutout means for cutting out a template from a template selection image; a marginal similarity calculation means for calculating marginal similarity distribution information, which is a similarity distribution of the template selection image to the template; a search image similarity calculation part for calculating search image similarity distribution information, which is a similarity distribution of the search image to the template; a similarity distribution-to-similarity distribution similarity calculation means for calculating similarity distribution-to-similarity distribution similarity information between the marginal similarity distribution information and the search image similarity distribution information; and a matching position determination part for determining a matching position based on the similarity distribution-to-similarity distribution similarity.

The marginal similarity distribution information and the search image similarity distribution information are suitably images having a similarity for each coordinate as a pixel value.

The marginal similarity distribution information and the search image similarity distribution information suitably have lower resolution than the template selection image and the search image respectively, which are original images of each.

Areas in which there is a high degree of similarity between the marginal similarity distribution information and the search image similarity distribution information are suitably extended.

The marginal similarity distribution information and the search image similarity distribution information suitably include coordinate information of locations with a high degree of similarity and similarities thereof.

When calculating the similarity distribution-to-similarity distribution similarity information, matching of locations with a high degree of similarity is suitably determined with a predetermined width.

Two images with the same field of vision and different noise for cutting out a template and calculating a marginal similarity distribution are suitably used as the template selection images.

The inspection apparatus suitably further includes a means for storing the template and the template selection image, or the template and the marginal similarity distribution by associating them.

The marginal similarity distribution information and the search image similarity distribution information are suitably generated for each magnification from the template selection image and the search image, which are photographed under a plurality of magnifications before a matching position being determined based on the above information.

If there are many locations where a high degree of similarity is found in the marginal similarity distribution, the selected template is suitably determined to be inappropriate before a warning being issued.

If a rotation or expansion/contraction occurs between the template selection image and the search image, a degree thereof is suitably detected before the template and the marginal similarity distribution being corrected in accordance with the degree.

Another inspection apparatus performing template matching to a search image according to the present invention includes: a template cutout means for cutting out a template from a template selection image; a marginal similarity calculation means for calculating marginal similarity distribution information, which is a similarity distribution of the template selection image to the template; a matching prime candidate selection part for selecting and cutting out an area of the search image with a high degree of similarity to the template as a matching prime candidate; a search image similarity calculation part for calculating search image versus prime candidate similarity distribution information, which is a similarity distribution of the search image to the matching prime candidate; a similarity distribution-to-similarity distribution similarity calculation means for calculating similarity distribution-to-similarity distribution similarity information between the marginal similarity distribution information and the search image versus prime candidate similarity distribution information; and a matching position determination part for determining a matching position based on the similarity distribution-to-similarity distribution similarity.

According to the present invention, a matching position can correctly be determined even if a pattern similar to a template exists in a search image.

DESCRIPTION OF THE PREFERRED EMBODIMENTS

Figure 1:
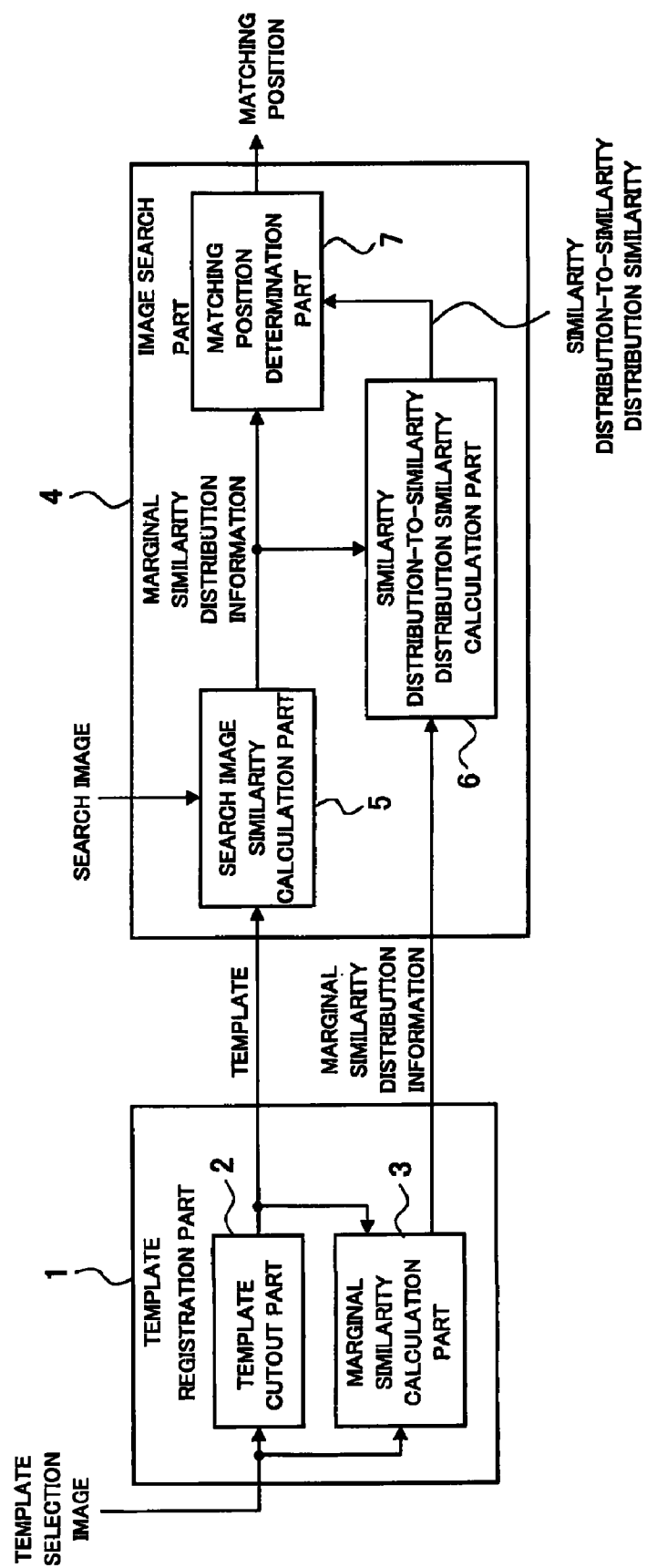
FIG. 1 is a block diagram showing a configuration of an inspection apparatus in a first embodiment of the present invention.

FIG. 1 is a block diagram showing the configuration of an inspection apparatus in a first embodiment of the present invention. An image photographed by a camera or electron microscope or an image temporarily stored is input into a template registration part 1 as a template selection image. A template cutout part 2 cuts out a template from the template selection image input in the template registration part 1. A marginal similarity calculation part 3 outputs a similarity distribution of the template selection image to the template as marginal similarity distribution information. The template and marginal similarity distribution information are stored in the template registration part 1 until template matching is performed to a search image.

When an image photographed by a camera or electron microscope or an image temporarily stored is input into an image search part 4 as a search image, a search image similarity calculation part 5 outputs a similarity distribution of the search image to the template as search image similarity distribution information. A similarity distribution-to-similarity distribution similarity calculation part 6 outputs a similarity between the marginal similarity distribution information and search image similarity distribution information as a similarity distribution-to-similarity distribution similarity. A matching position determination part 7 determines a matching position from the search image similarity distribution information and the similarity distribution-to-similarity distribution similarity.

Details of each processing of the inspection apparatus shown in FIG. 1 will be described below.

Figure 2:
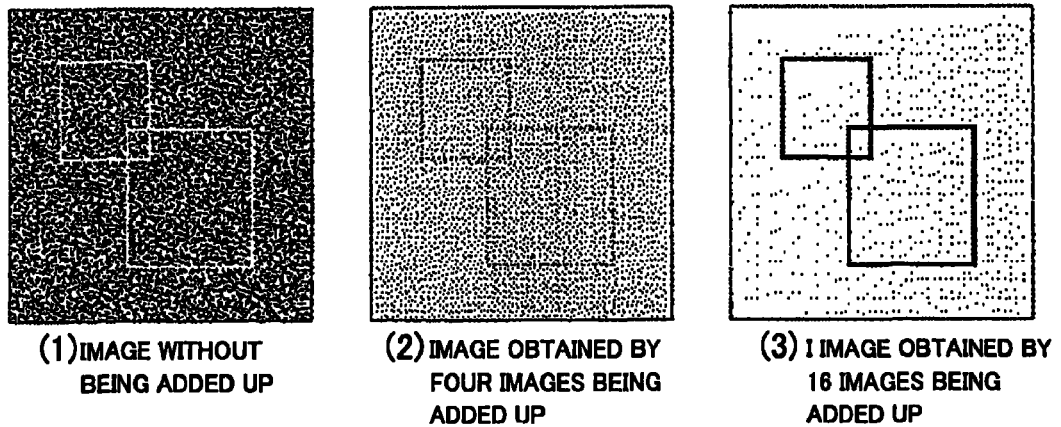
FIG. 2 is a template selection image and a scanning electron microscope image input as a search image.

FIG. 2 shows a template selection image and a scanning electron microscope image input as a search image. The scanning electron microscope image has a very high level of noise and thus, it is difficult to read patterns that are buried in noise as they are. Thus, the same image is photographed several times to add up the image. Noise changes randomly each time the image is photographed while pattern information does not change after the image is photographed again and thus, noise is reduced by adding up the image to allow a pattern to clearly show up.

Figure 3:
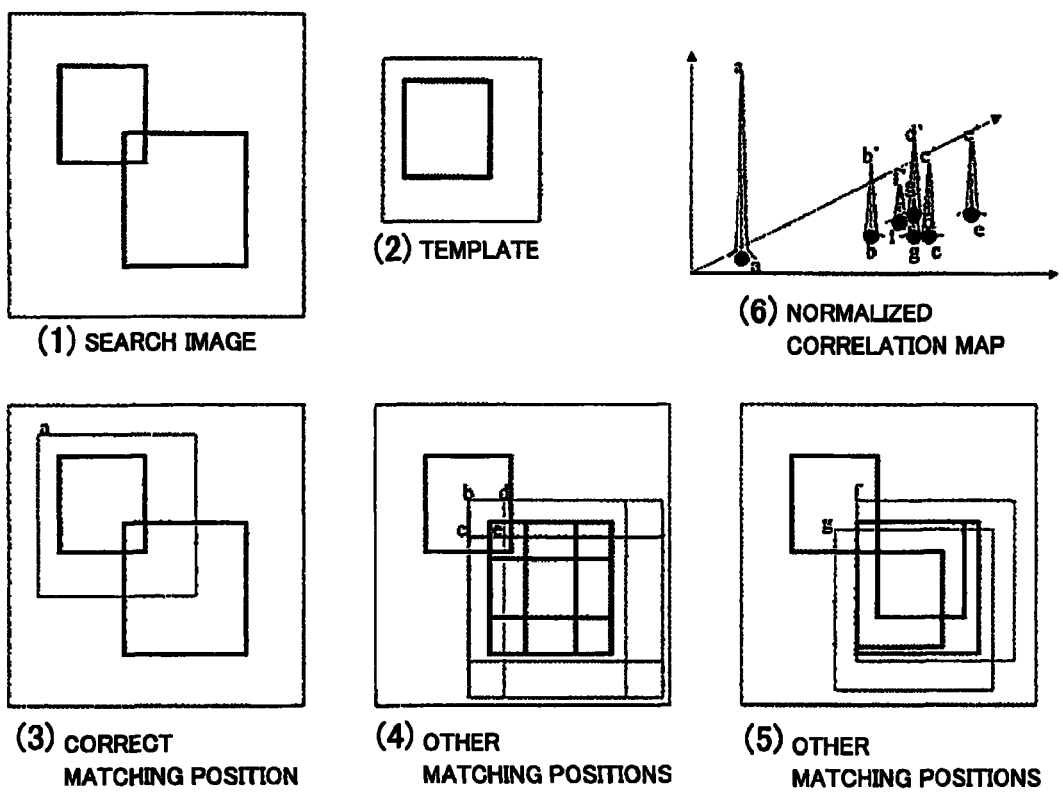
FIG. 3 is a conceptual diagram of template matching.

Next, template matching will be described with reference to FIG. 3. (1) shows a search image and (2) shows a template (reference image). Template matching is processing to detect a portion in the search image that is the same as the template. More specifically, processing can be mentioned, for example, in which a normalized correlation is calculated by shifting the template to the search image to superimpose the template over the search image before determining a position with the highest correlation value as the position having the same pattern as the template. CD-SEM is an inspection apparatus for length measurement of a specific position on a semiconductor wafer using a scanning electron microscope. To determine a position on a wafer to be measured, a portion having a unique pattern near a position to be measured is registered as a template when the first wafer is measured and thereafter, the position to be measured will be determined based on coordinates obtained by the template matching for measurement of the same position. In FIG. 3, position a in (3) shows the same pattern as that of the template. After that, positions b, c, d, and e in (4) have large correlation values, though they do not show the same pattern. Further, after that, positions f and g in (5) have large correlation values. There is almost no correlation at any other position, producing a correlation value near 0. (6) is called a normalized correlation map and is an image having a correlation value for each coordinate as a pixel value. A value is taken at a, which is a value near 1. Values b', c', d', e', f', and g' are taken at b, c, d, e, f, and g respectively, but these values are smaller than a'. The normalized correlation map is a concrete example of similarity distribution information.

When performing template matching, it is desirable to perform filtering such as noise removal and edge enhancement to an input image as pre-processing before calculating a normalized correlation.

Figure 4:
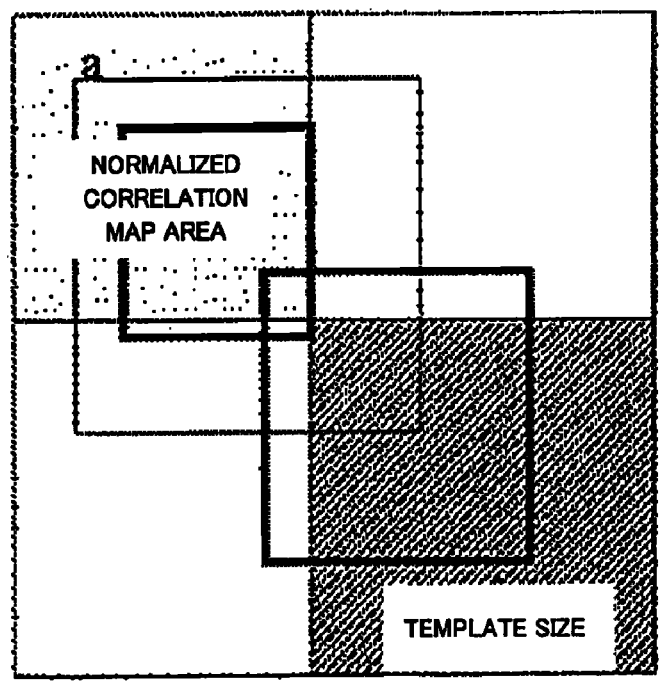
FIG. 4 is a diagram showing a size of a normalized correlation map area.

FIG. 4 is a diagram showing the size of a normalized correlation map area. If the value of each point in the normalized correlation map is defined as a correlation value with a template when an upper left end of the template is aligned with the point, a lower right end of the normalized correlation map matches the upper left end of the template when the template is superimposed on the search image in such a way that lower and right edges of both match. Therefore, the normalized correlation map area has a size obtained by subtracting horizontal and vertical lengths of the template from horizontal and vertical lengths of the search image respectively.

Figure 5:
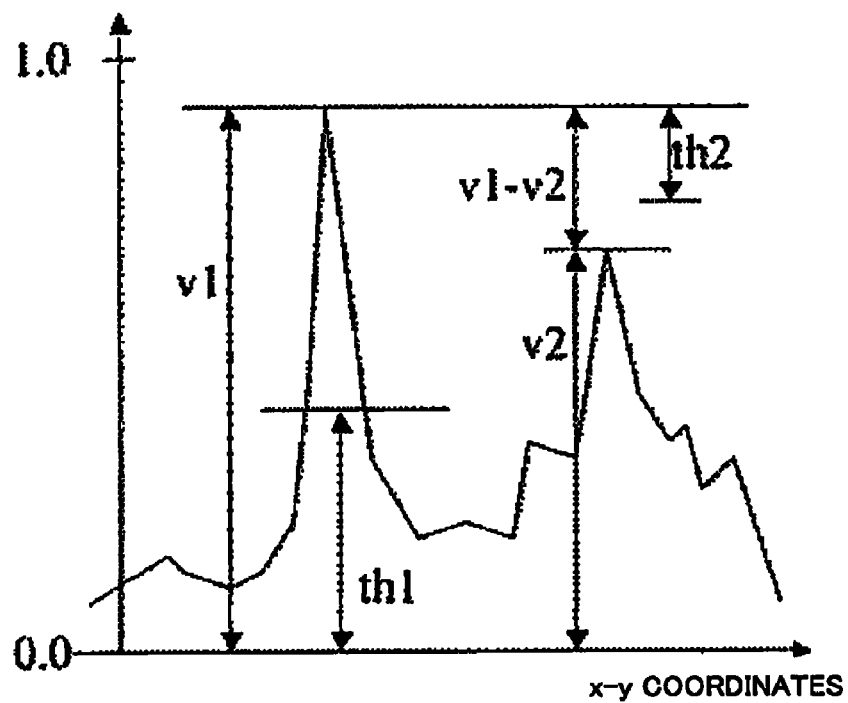
FIG. 5 is a diagram exemplifying a method of determining a matching position from the normalized correlation map.

FIG. 5 is a diagram exemplifying a method of determining a matching position from the normalized correlation map. The horizontal axis represents x-y coordinates and the vertical axis represents the correlation value. The position with the largest correlation value is a position matching the template most. It is reasonable to consider that there is no position that matches the template when a maximum value v1 of the correlation value is smaller than a predetermined threshold th1. If a difference v1−v2 from a second largest correlation value v2 is smaller than a predetermined threshold th2, a method such as determining a matching position based on a magnitude of the similarity distribution-to-similarity distribution similarity, instead of the correlation value, can be considered. Or, a method of determining a matching position based on, after assigning a predetermined weight to each of the correlation value and similarity distribution-to-similarity distribution similarity, the magnitude of a sum of weight can also be considered.

Figure 6:
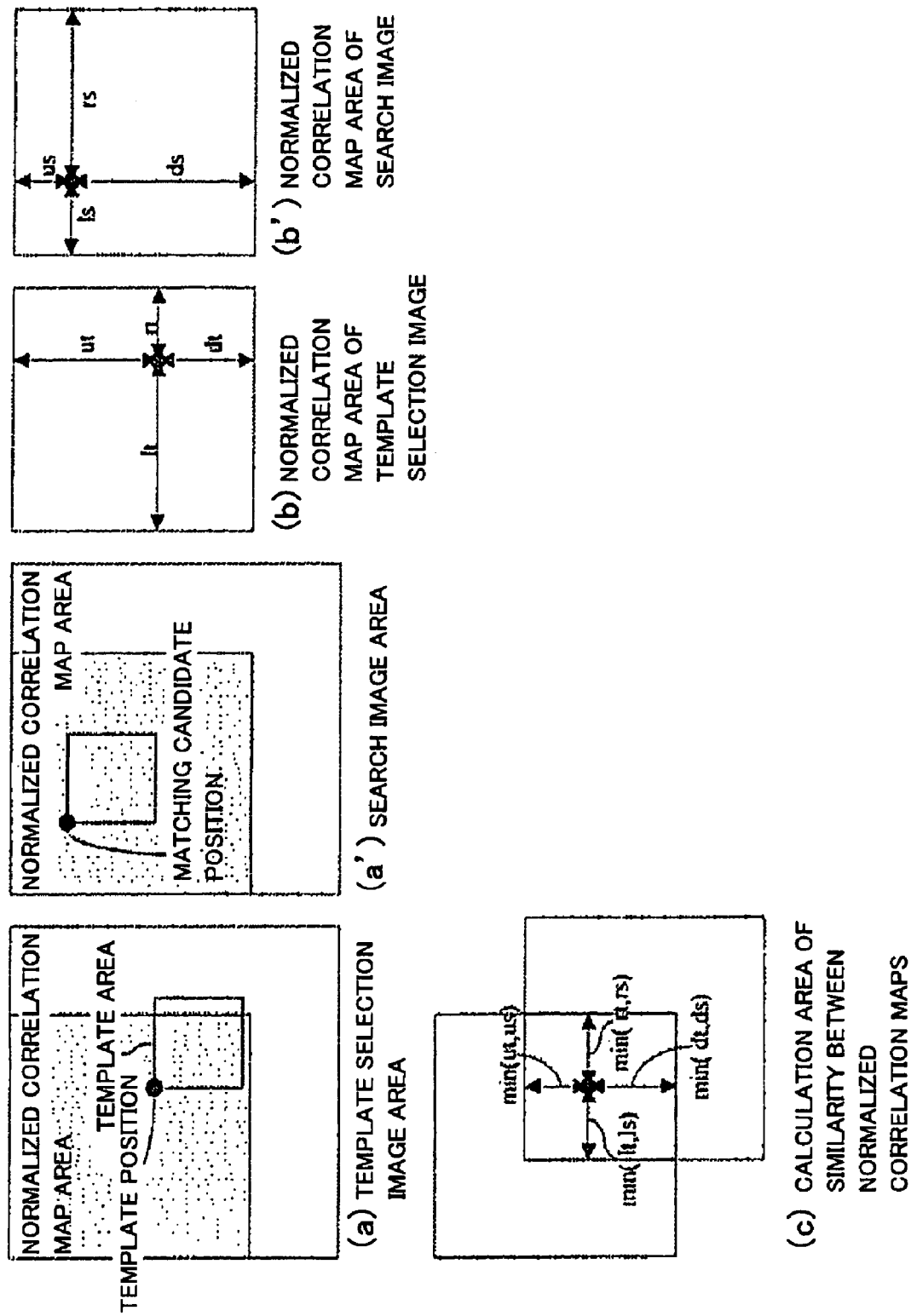
FIG. 6 is a diagram illustrating the size of an area that can be used for calculating a similarity between normalized correlation maps.

FIG. 6 is a diagram illustrating the size of an area that can be used for calculating a similarity distribution-to-similarity distribution similarity when a normalized correlation map is used as a similarity distribution, that is, a similarity between normalized correlation maps. As already shown in FIG. 4, a normalized correlation map area of a template selection image and that of a search image are shaded areas of (a) and (b) obtained by removing the size of a template from each image area. If the template position is lt from the left edge, rt from the right edge, ut from the upper edge, and dt from the lower edge of the normalized correlation map area of the template selection image and the template position is ls from the left edge, rs from the right edge, us from the upper edge, and ds from the lower edge of the normalized correlation map area of the search image, a calculation area of a similarity between normalized correlation maps will be an area of min (lt, ls)+min (rt, rs) in a horizontal direction and min (ut, us)+min (dt, ds) in a vertical direction. This area will be narrower as the template position and matching candidate position deviate more. If the calculation area of a similarity between normalized correlation maps becomes too small, the similarity between normalized correlation maps will lose its meaning. Thus, in such a case, it becomes necessary to devise a method of, for example, photographing again an image of a wider area by lowering the photographing magnification.

Figure 7:
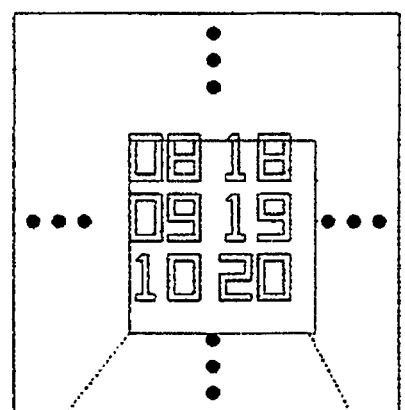
FIG. 7 is a diagram showing an example of template matching using similarity distribution information.
Figure 7:
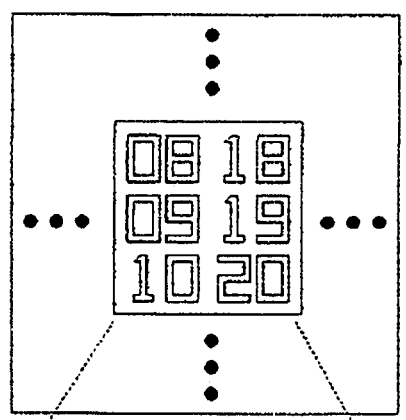
Figure 7:
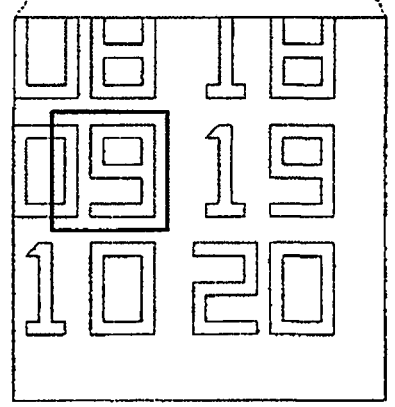
Figure 7:
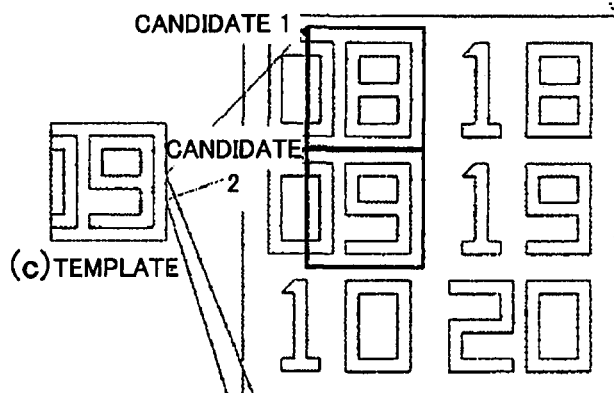
Figure 7:
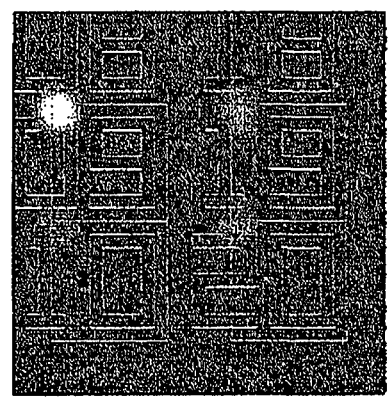
Figure 7:
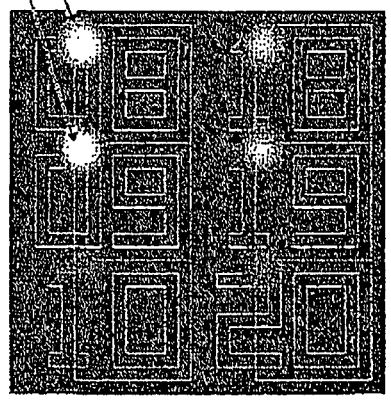

FIG. 7 is a diagram showing an example of template matching using similarity distribution information. First, a measuring position of an object (a) is photographed and a unique pattern contained therein is registered as a template. An image (b) photographed at this point is called a template selection image and a unique pattern (c) selected from the template selection image is called a template. Next, when another object (a') ((a') may be another position having the same pattern on the same wafer as (a), for example, the same portion of a die formed repeatedly on the same wafer, or a position having the same pattern on a different wafer) is photographed, a photographed image is searched for a pattern that matches the template. The photographed image (b') is called a search image. There is a deviation of a positioning error of a stage between the template selection image (b) and the search image (b'). The deviation is corrected by template matching. As a result of template matching, positions with a high degree of similarity to the template become matching position candidates and, among these candidates, a position most suitable as a matching position will be the final matching position. In the present invention, when determining one of candidate 1 and candidate 2 as a matching position, candidate 2 can be selected as a matching position using marginal similarity distribution information (d) and search image similarity distribution information (d') even if the similarity of candidate 1 and that of candidate 2 show very close values or are reversed. That is, superimposition of the marginal similarity distribution information whose origin is the template position in the template selection image on the search image similarity distribution information whose origin is the position of candidate 2 shows that the two pieces of similarity distribution information are very similar. In other words, both pieces of information are brightest around the origin and considerably darker positions exist to the right, below, and to the lower right. The search image similarity distribution information whose origin is the position of candidate 1 has the brightest portion below, indicating that the degree of similarity is low.

When determining a degree of similarity between similarity distribution information, the normalized correlation value at the template position in the template selection image is always 1 and thus, the degree of similarity at this position must be excluded from a determination of the degree of similarity. This is a harmful effect caused by a fact that the template selection image completely (including even noise) matches the template at the template position. Or, in order to avoid this harmful effect, the template selection image may be photographed twice under the same condition to cut out a template from one template selection image before determining marginal similarity distribution information from the other template selection image.

Since normalized correlation maps tend to have large values in a narrow range, it is better, in consideration of pattern distortion and image rotation (An image may rotate slightly in an electron microscope due to Lorentz force), to determine a degree of similarity between normalized correlation maps after enhancing bright portions by applying a Gaussian filter or maximization filter to the normalized correlation maps rather than use the normalized correlation maps as they are. It is also an effective means to determine a degree of similarity between normalized correlation maps by lowering the resolution of normalized correlation maps for speed improvement.

Further, similarity distribution information may be represented, instead of images, by a list of coordinate information and a degree of similarity of positions having a high degree of similarity.

Figure 8:
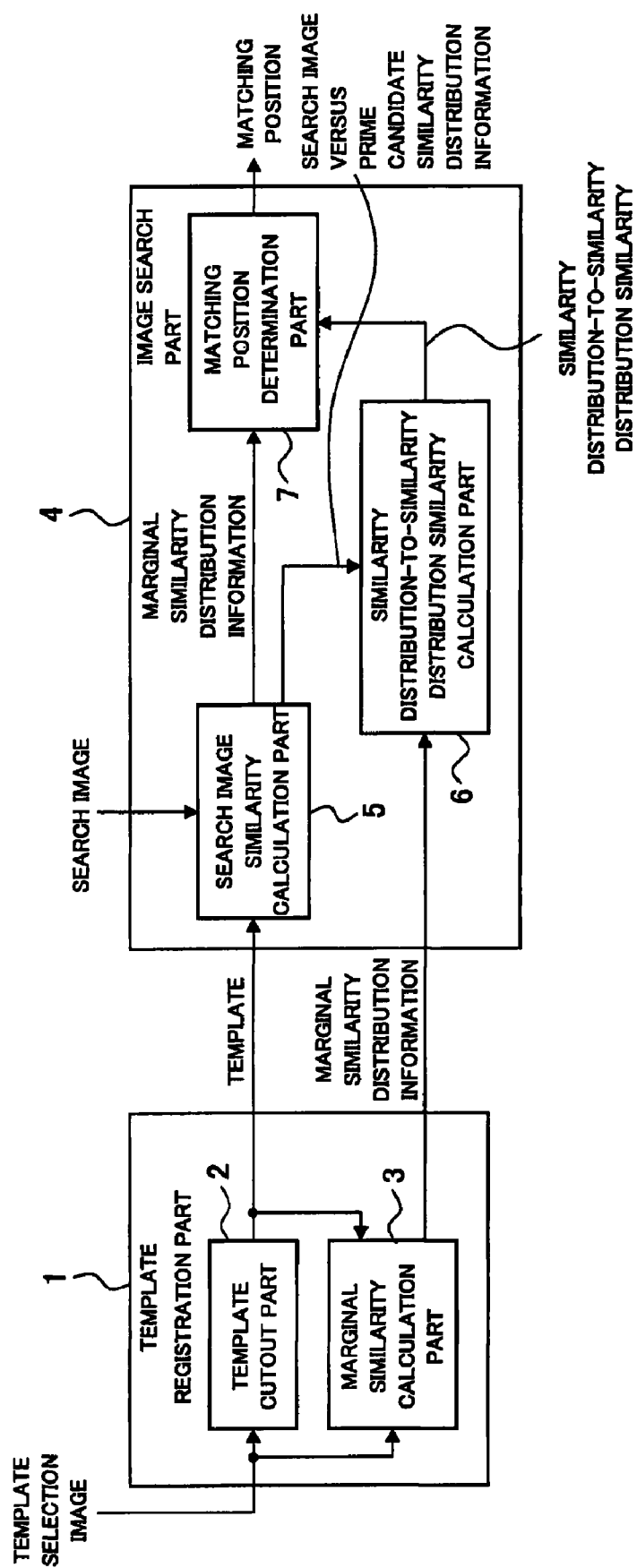
FIG. 8 is a block diagram showing the configuration of an inspection apparatus in a second embodiment of the present invention.

FIG. 8 is a block diagram showing the configuration of an inspection apparatus in a second embodiment of the present invention. The same numeral as that in FIG. 1 indicates the same component. An image photographed by a camera or electron microscope or an image temporarily stored is input into the template registration part 1 as a template selection image. The template cutout part 2 cuts out a template from the template selection image input in the template registration part 1. The marginal similarity calculation part 3 outputs a similarity distribution of the template selection image to the template as marginal similarity distribution information. The template and marginal similarity distribution information are stored in the template registration part 1 until template matching is performed to a search image.

The second embodiment is different from the first embodiment shown in FIG. 1 in that search image similarity distribution information output from the search image similarity calculation part 5 to the similarity distribution-to-similarity distribution similarity calculation part 6 is not a similarity distribution of a search image to a template, but similarity distributions to matching prime candidates in the search image. Matching prime candidates are areas cut out from the search image in descending order of similarity to the template.

When an image photographed by a camera or electron microscope or an image temporarily stored is input into the image search part 4 as a search image, the search image similarity calculation part 5 outputs similarity distributions of the search image to the matching prime candidates as search image versus prime candidate similarity distribution information. The similarity distribution-to-similarity distribution similarity calculation part 6 outputs a similarity between the marginal similarity distribution information and search image versus prime candidate similarity distribution information as a similarity distribution-to-similarity distribution similarity. The matching position determination part 7 determines a matching position from the search image similarity distribution information and the similarity distribution-to-similarity distribution similarity.

In the first embodiment, the similarity distribution-to-similarity distribution similarity calculation part 6 may calculate a similarity distribution-to-similarity distribution similarity with regards to search image similarity distribution information having its origin at each point in the search image in a form of distribution before outputting the similarities to the matching position determination part, but in the second embodiment, similarity distribution-to-similarity distribution similarities are calculated only for several predetermined matching prime candidates before being output to the matching position determination part. In this way, even if a slight rotation or distortion occurs between the template and search image, search image similarity distribution information can be shielded from such an effect. This is because matching prime candidates are partial images of the search image and are subject to a similar rotation or distortion.

Figure 9:
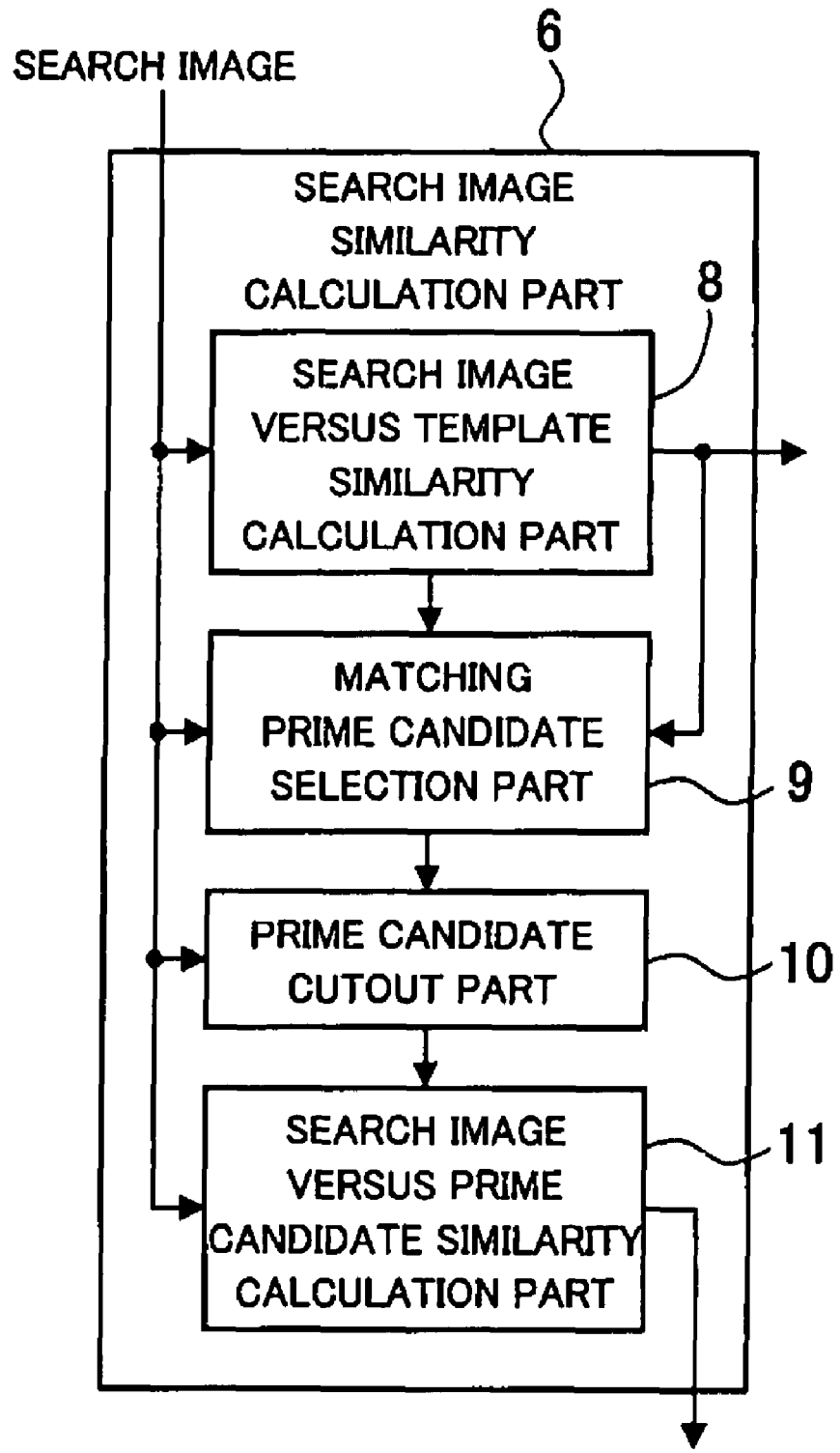
FIG. 9 is a block diagram showing details of a search image similarity calculation part in the second embodiment.

FIG. 9 is a block diagram showing details of the search image similarity calculation part 6 in the second embodiment. A search image versus template similarity calculation part 8 determines a distribution of similarities of a search image to a template from the search image and template. The distribution of similarities is transferred to a matching prime candidate selection part 9, where several coordinates having a high degree of similarity are selected as prime candidates.

In the first embodiment, a similarity at each point of the search image may be transferred to the matching position determination part 7 as search image similarity distribution information, but in the second embodiment, coordinates and similarities of matching prime candidates are transferred to the matching position determination part 7 as a list.

The prime candidate coordinates determined by the matching prime candidate selection part 9 are transferred to a prime candidate cutout part 10, where areas corresponding to the template in each coordinate are cut out from the search image. A search image versus prime candidate similarity distribution calculation part 11 calculates similarity distribution information of the search image to each prime candidate.

At this point, coordinates of the prime candidates are also transferred to the similarity distribution-to-similarity distribution similarity calculation part 6 and only a similarity distribution-to-similarity distribution similarity having these coordinates as their origins are calculated.

Figure 10:
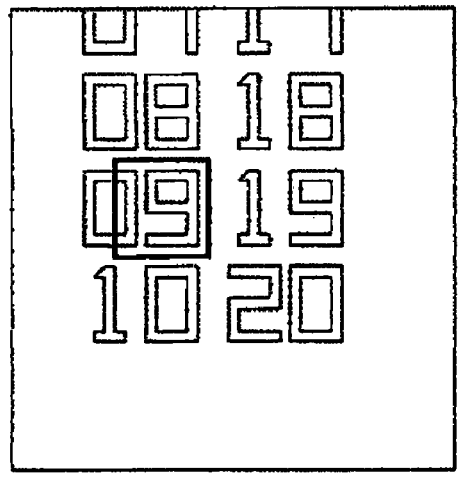
FIG. 10 is a conceptual diagram (without offset) when photographed under low magnification.
Figure 10:
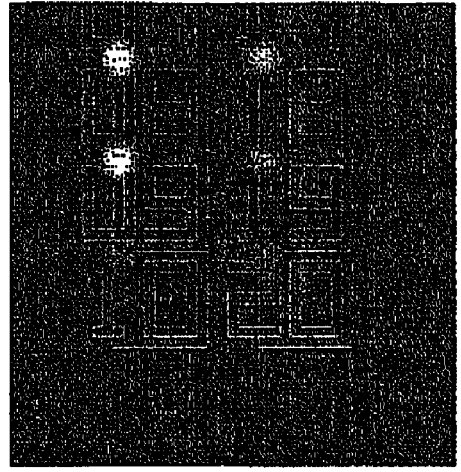
Figure 10:

FIG. 10 shows (1) search image and (3) template photographed under magnification of ⅔ with respect to the example in FIG. 7. (2) Normalized correlation map of the search image spreads more widely as compared with FIG. 7 and an area for calculating a similarity between normalized correlation maps can also be taken more widely.

Figure 11:
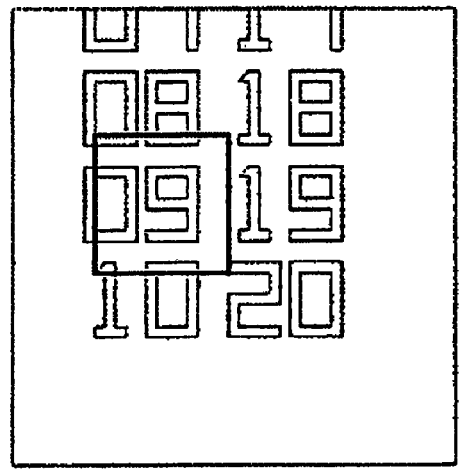
FIG. 11 is a conceptual diagram (with an offset) when photographed under low magnification.
Figure 11:
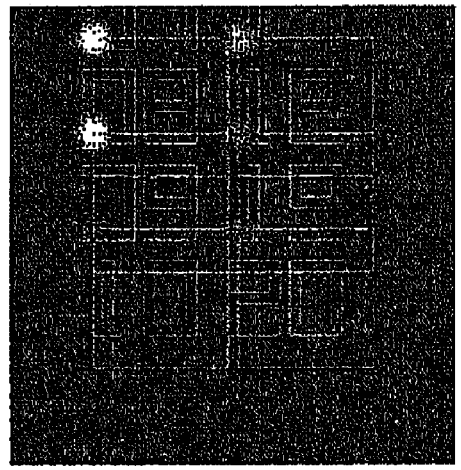
Figure 11:
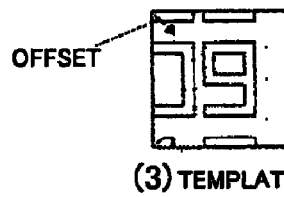

FIG. 11 shows photos taken under the same magnification as that of FIG. 10 while retaining the original size of the template without reducing to a ⅔ size. As a result, (3) template occupies a wider area than in FIG. 7. Also, (2) normalized correlation map of the search image seems as if to have been translated for an offset of the template. Attention must be paid to this when the template size is not changed in accordance with the photographing magnification.

Figure 12:
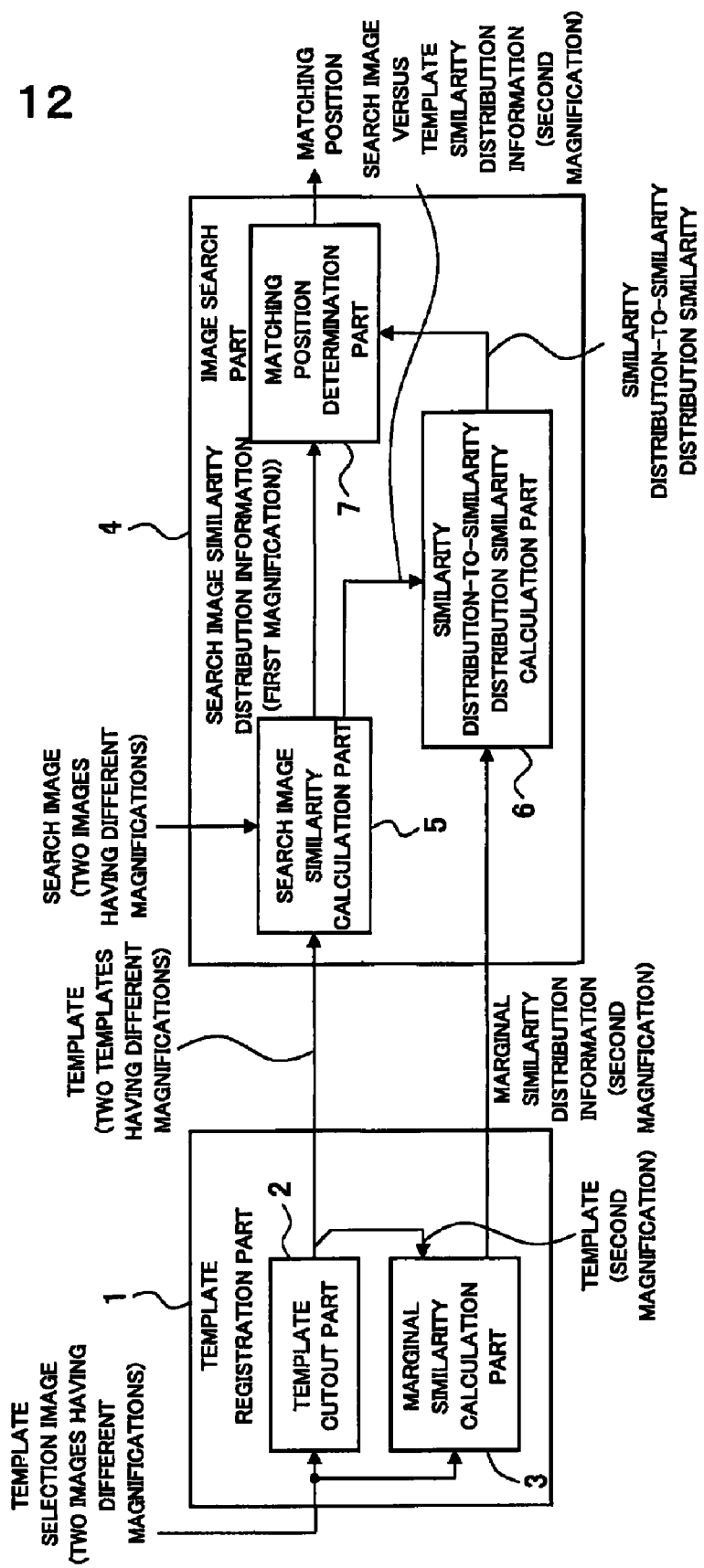
FIG. 12 is a block diagram showing a modification of the first embodiment.

FIG. 12 is a block diagram showing a case in which a template selection image and a search image are photographed under different magnifications in order to take a wider area for calculating a similarity distribution-to-similarity distribution similarity in the first embodiment shown in FIG. 1. The same numeral as that in FIG. 1 indicates the same component. An image photographed by a camera or electron microscope or an image temporarily stored is input into the template registration part 1 as a template selection image. The template cutout part 2 cuts out a template from the template selection image input in the template registration part 1. The marginal similarity calculation part 3 outputs a similarity distribution of the template selection image to the template as marginal similarity distribution information. The template and marginal similarity distribution information are stored in the template registration part 1 until template matching is performed to a search image.

When an image photographed by a camera or electron microscope or an image temporarily stored is input into the image search part 4 as a search image, the search image similarity calculation part 5 outputs similarity distributions of the search image to matching prime candidates as search image versus prime candidate similarity distribution information. The similarity distribution-to-similarity distribution similarity calculation part 6 outputs a similarity between the marginal similarity distribution information and search image versus prime candidate similarity distribution information as a similarity distribution-to-similarity distribution similarity. The matching position determination part 7 determines a matching position from the search image similarity distribution information and the similarity distribution-to-similarity distribution similarity.

In the example shown in FIG. 12, in contrast to FIG. 1, the template cutout part 2 cuts out two templates having different magnifications. Only the second magnification is used for calculating marginal similarity distribution information. The search image similarity calculation part 5 calculates search image similarity distribution information for each of two magnifications. Only the second magnification is used for calculating a similarity distribution-to-similarity distribution similarity.

Figure 13:
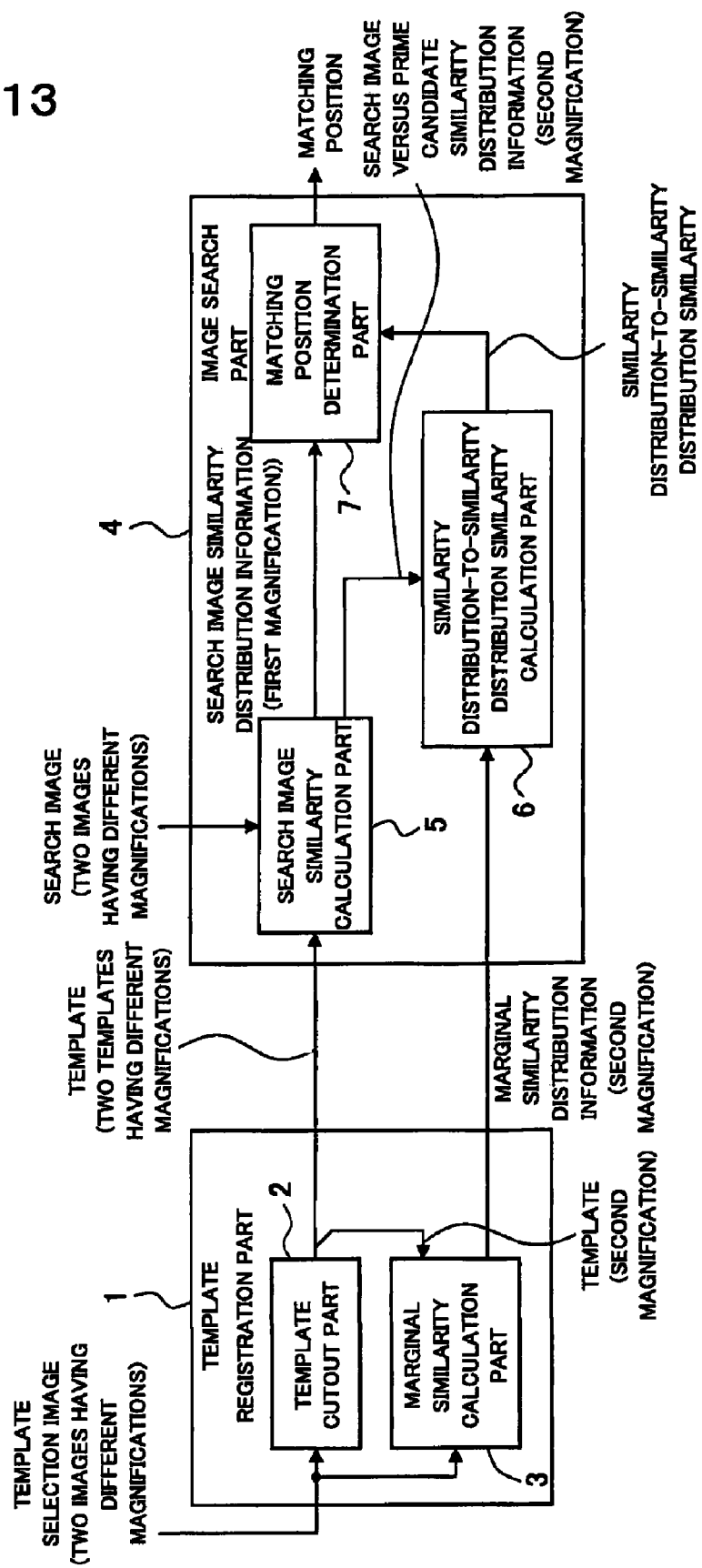
FIG. 13 is a block diagram showing a modification of the second embodiment.

FIG. 13 shows an example in which a template selection image and a search image are photographed under different magnifications in the second embodiment shown in FIG. 8. The same numeral as that in FIG. 8 indicates the same component. An image photographed by a camera or electron microscope or an image temporarily stored is input into the template registration part 1 as a template selection image. The template cutout part 2 cuts out a template from the template selection image input in the template registration part 1. The marginal similarity calculation part 3 outputs a similarity distribution of the template selection image to the template as marginal similarity distribution information. The template and marginal similarity distribution information are stored in the template registration part 1 until template matching is performed to a search image.

When an image photographed by a camera or electron microscope or an image temporarily stored is input into the image search part 4 as a search image, the search image similarity calculation part 5 outputs similarity distributions of the search image to matching prime candidates as search image versus prime candidate similarity distribution information. The similarity distribution-to-similarity distribution similarity calculation part 6 outputs a similarity between the marginal similarity distribution information and search image versus prime candidate similarity distribution information as a similarity distribution-to-similarity distribution similarity. The matching position determination part 7 determines a matching position from the search image similarity distribution information and the similarity distribution-to-similarity distribution similarity.

When compared with a case in which a template selection image and a search image are photographed under different magnifications in the example shown in FIG. 12, the example shown in FIG. 13 is different in that search image similarity distribution information output from the search image similarity calculation part 5 to the similarity distribution-to-similarity distribution similarity calculation part 6 is not a similarity to the template of the second magnification, but similarities to the prime candidates of the second magnification.

Figure 14:
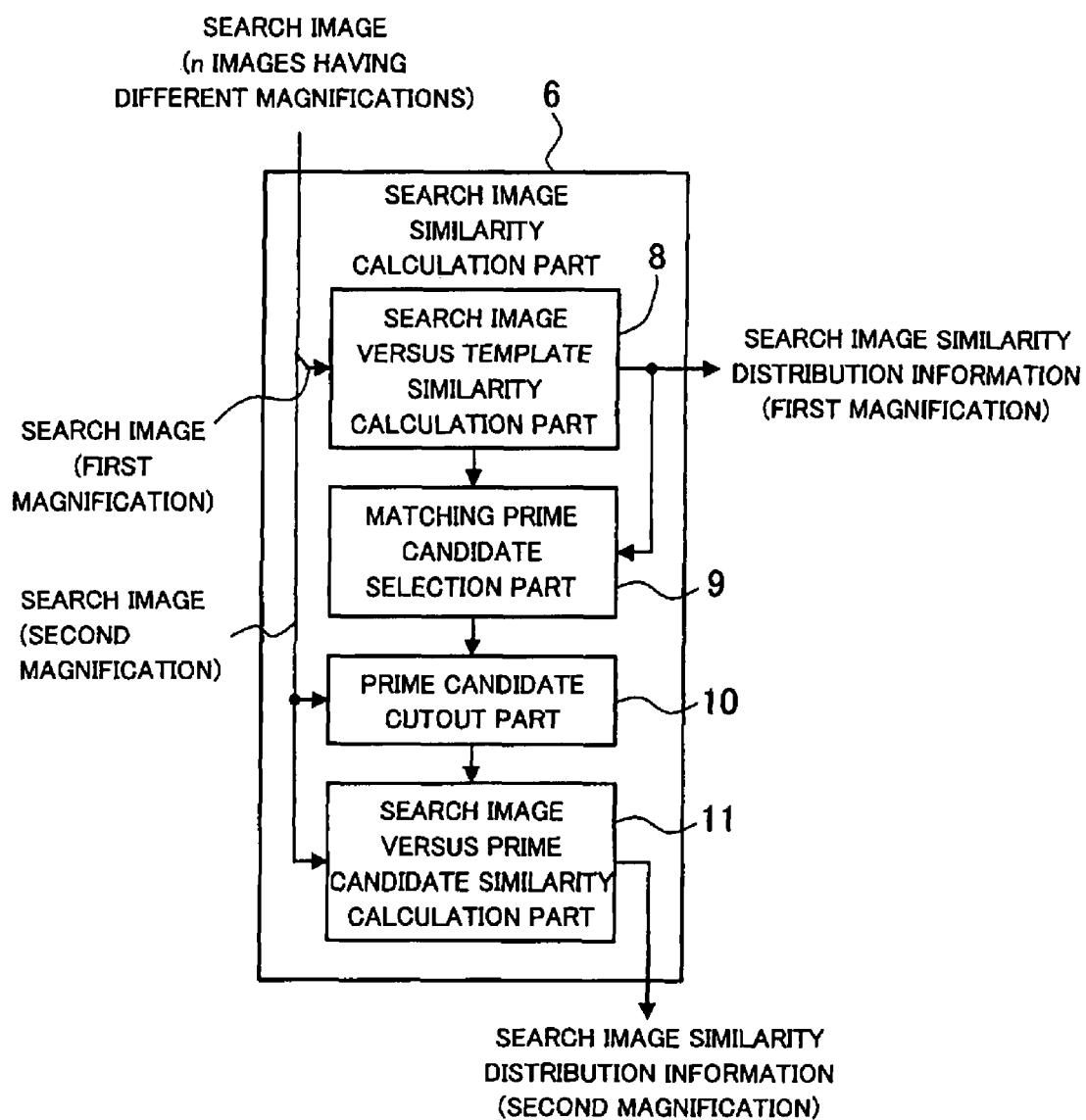
FIG. 14 is a block diagram showing details of a search image similarity calculation part of the modification of the second embodiment.

FIG. 14 shows details of the search image similarity calculation part 6 in FIG. 13. The same numeral as that in FIG. 9 indicates the same component. The search image versus template similarity calculation part 8 determines a similarity distribution of a search image to a template from the search image and template. The similarity distribution is transferred to the matching prime candidate selection part 9, where several coordinates having a high degree of similarity are selected as prime candidates. The prime candidate coordinates determined by the matching prime candidate selection part 9 are transferred to the prime candidate cutout part 10, where areas corresponding to the template in each coordinate are cut out from the search image. The search image versus prime candidate similarity distribution calculation part 11 calculates similarity distribution information of the search image to each prime candidate.

The example shown in FIG. 14 is different from that shown in FIG. 9 in that the search image versus template similarity calculation part 8 uses only the first magnification, while the prime candidate cutout part 10 and search image versus prime candidate similarity distribution calculation part 11 use only the second magnification.

FIG. 12 to FIG. 14 showed cases of two-stage magnifications, but generally n-stage magnifications can also be considered in the same way as the two-stage magnifications. However, similarity distribution-to-similarity distribution similarities under a plurality of magnifications are input into the matching position determination part and thus, how to handle such inputs must be defined. One example is to use a weighted sum of similarity distribution-to-similarity distribution similarities under each magnification. Another example is to use, while changing the magnification, the similarity distribution-to-similarity distribution similarity under the first magnification after variations of similarity distribution-to-similarity distribution similarity fall within a threshold.

Figure 15:
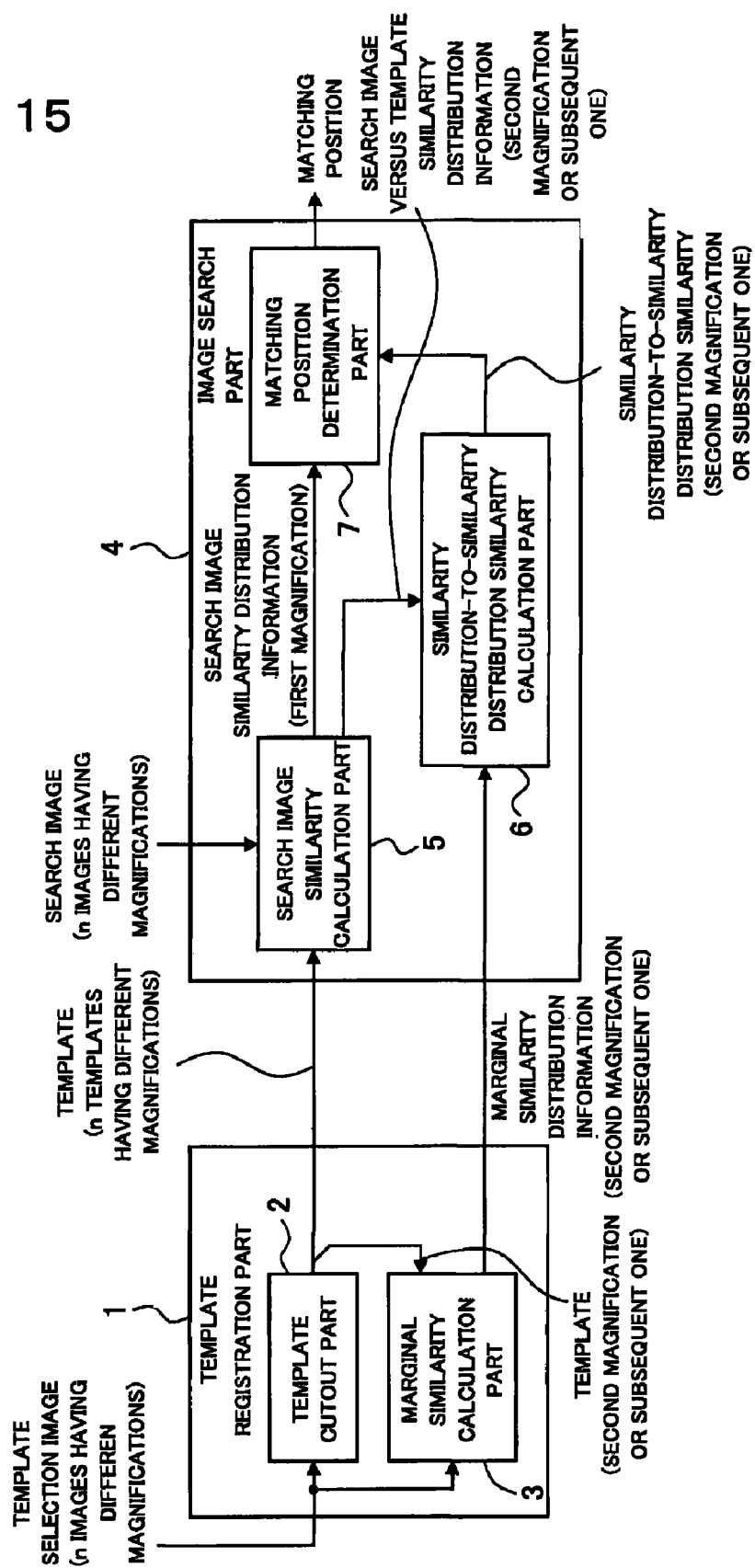
FIG. 15 is a block diagram showing a modification of the first embodiment whose magnification is n.
Figure 16:
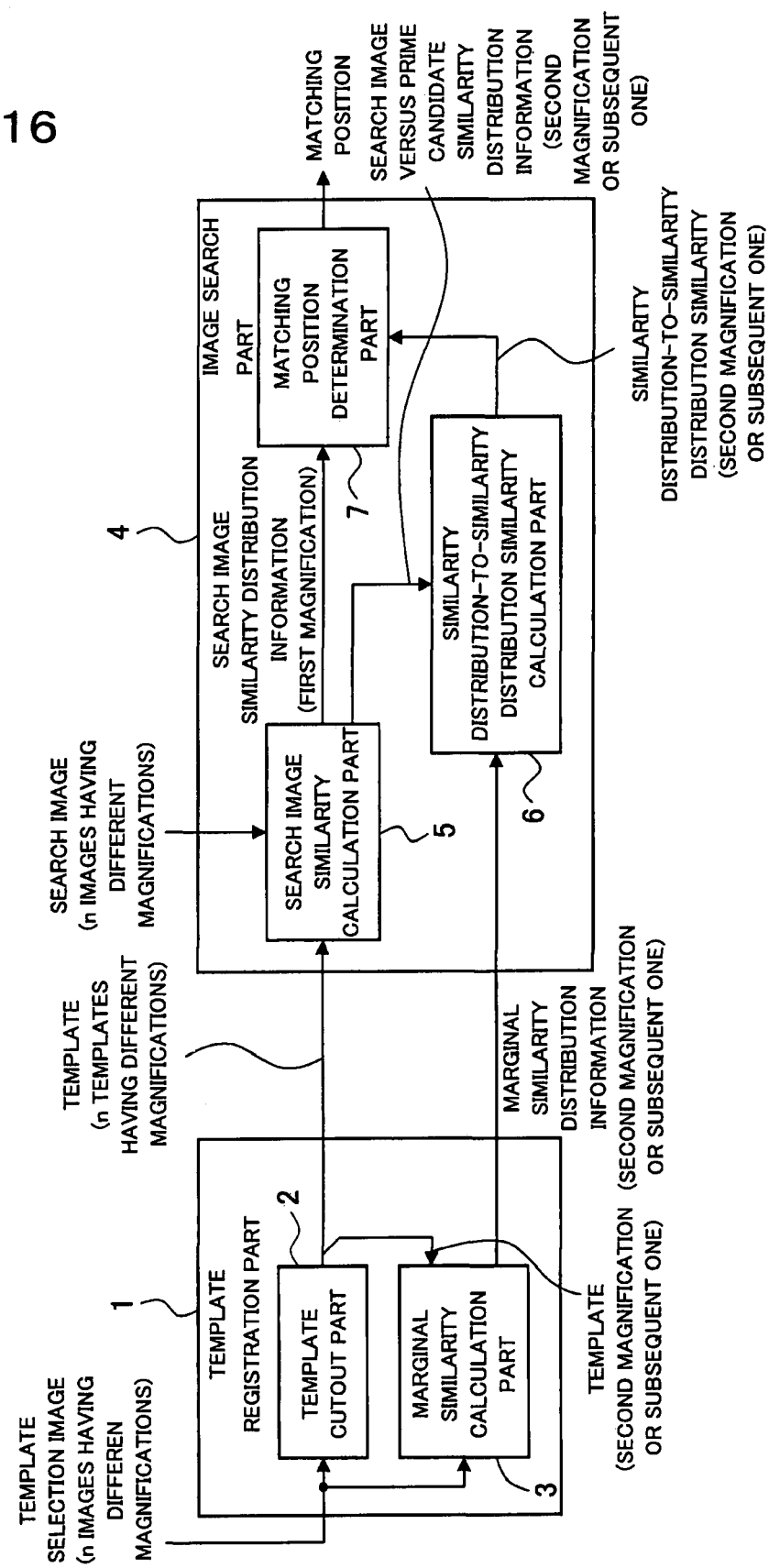
FIG. 16 is a block diagram showing a modification of the second embodiment whose magnification is n.
Figure 17:
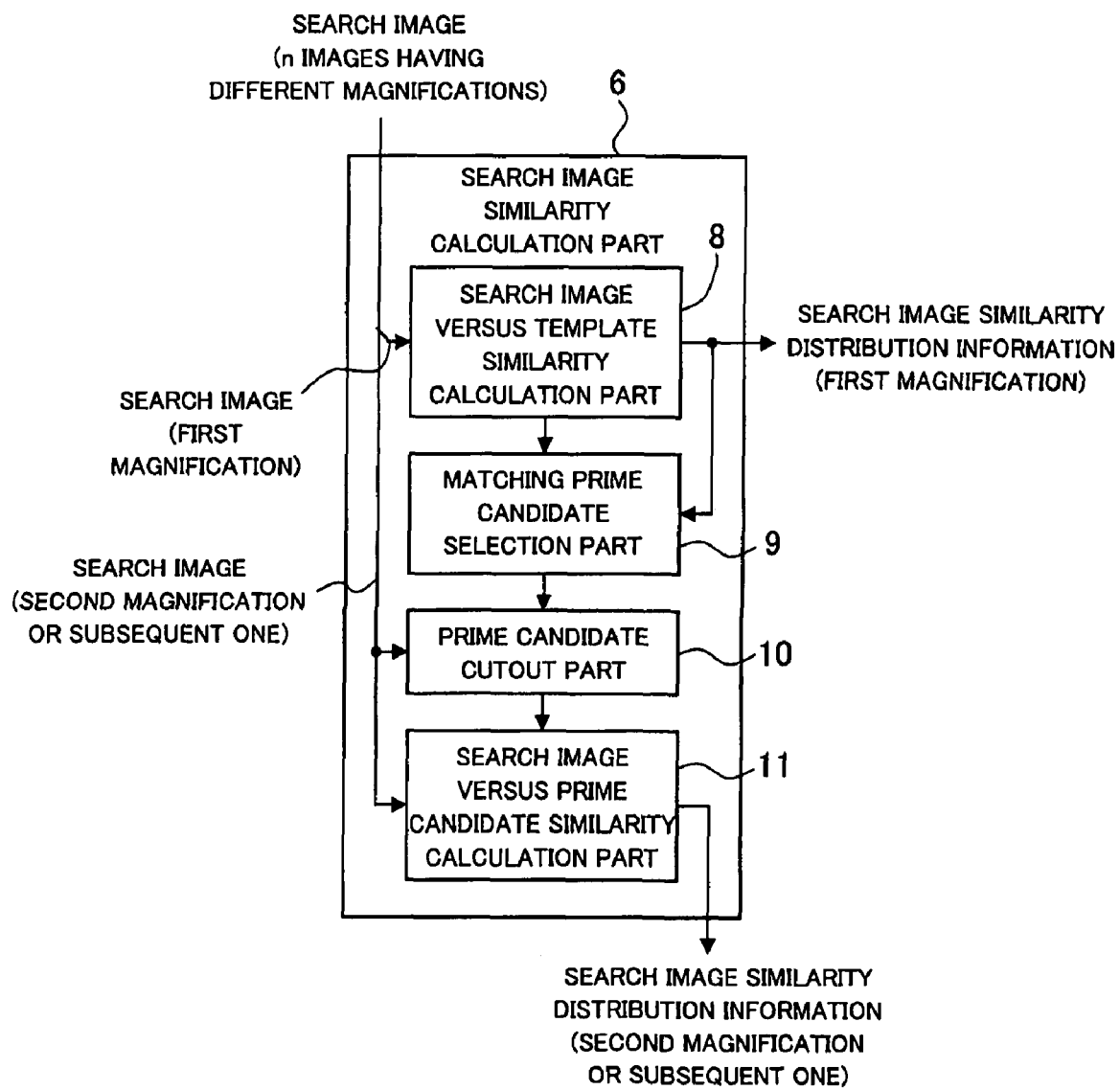
FIG. 17 is a diagram showing details of a search image similarity calculation part of the modification of the second embodiment whose magnification is n.

FIG. 15 to FIG. 17 show configurations corresponding to FIG. 12 to FIG. 14 when n-stage magnifications are used.

FIG. 15 is a diagram showing a case in which, instead of the two-stage magnifications shown in FIG. 12, a template selection image and a search image are photographed under n-stage magnifications. The same numeral as that in FIG. 12 indicates the same component. An image photographed by a camera or electron microscope or an image temporarily stored is input into the template registration part 1 as a template selection image. The template cutout part 2 cuts out a template from the template selection image input in the template registration part 1. The marginal similarity calculation part 3 outputs a similarity distribution of the template selection image to the template as marginal similarity distribution information. The template and marginal similarity distribution information are stored in the template registration part 1 until template matching is performed to a search image.

When an image photographed by a camera or electron microscope or an image temporarily stored is input into the image search part 4 as a search image, the search image similarity calculation part 5 outputs similarity distributions of the search image to matching prime candidates as search image versus prime candidate similarity distribution information. The similarity distribution-to-similarity distribution similarity calculation part 6 outputs a similarity between the marginal similarity distribution information and search image versus prime candidate similarity distribution information as a similarity distribution-to-similarity distribution similarity. The matching position determination part 7 determines a matching position from the search image similarity distribution information and the similarity distribution-to-similarity distribution similarity.

In the example shown in FIG. 15, the template cutout part 2 cuts out n templates having different magnifications. The second to n-th magnifications are used for calculating marginal similarity distribution information. The search image similarity calculation part 5 calculates search image similarity distribution information for each of n magnifications. The second to n-th magnifications are used for calculating similarity distribution-to-similarity distribution similarities.

FIG. 16 is a diagram showing a case in which, instead of the two-stage magnifications shown in FIG. 13, a template selection image and a search image are photographed under n-stage magnifications. The same numeral as that in FIG. 13 indicates the same component. An image photographed by a camera or electron microscope or an image temporarily stored is input into the template registration part 1 as a template selection image. The template cutout part 2 cuts out a template from the template selection image input in the template registration part 1. The marginal similarity calculation part 3 outputs a similarity distribution of the template selection image to the template as marginal similarity distribution information. The template and marginal similarity distribution information are stored in the template registration part 1 until template matching is performed to a search image.

When an image photographed by a camera or electron microscope or an image temporarily stored is input into the image search part 4 as a search image, the search image similarity calculation part 5 outputs similarity distributions of the search image to matching prime candidates as search image versus prime candidate similarity distribution information. The similarity distribution-to-similarity distribution similarity calculation part 6 outputs a similarity between the marginal similarity distribution information and search image versus prime candidate similarity distribution information as a similarity distribution-to-similarity distribution similarity. The matching position determination part 7 determines a matching position from the search image similarity distribution information and the similarity distribution-to-similarity distribution similarity.

When compared with a case in which a template selection image and a search image are photographed under different magnifications in the example shown in FIG. 15, the example shown in FIG. 16 is different in that search image similarity distribution information output from the search image similarity calculation part 5 to the similarity distribution-to-similarity distribution similarity calculation part 6 is not similarities to the templates of the second to n-th magnifications, but similarities to the prime candidates of the second to n-th magnifications.

FIG. 17 shows details of the search image similarity calculation part 6 in FIG. 16. The same numeral as that in FIG. 14 indicates the same component. The search image versus template similarity calculation part 8 determines a similarity distribution of a search image to a template from the search image and template. The similarity distribution is transferred to the matching prime candidate selection part 9, where several coordinates having a high degree of similarity are selected as prime candidates. The prime candidate coordinates determined by the matching prime candidate selection part 9 are transferred to the prime candidate cutout part 10, where areas corresponding to the template in each coordinate are cut out from the search image. The search image versus prime candidate similarity distribution calculation part 11 calculates similarity distribution information of the search image to each prime candidate.

The example shown in FIG. 17 is different from that shown in FIG. 14 in that the search image versus template similarity calculation part 8 uses only the first magnification, while the prime candidate cutout part 10 and search image versus prime candidate similarity distribution calculation part 11 use the second to n-th magnifications.

Figure 18:
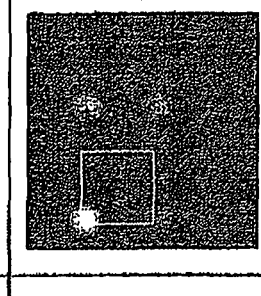
FIG. 18 is a diagram showing an example (without offset) of a confirmation screen of a registered template data set.

FIG. 18 shows an example of a confirmation screen of a registered template data set. One template data set comprises of images photographed under a plurality of magnifications (or one magnification) and an image of each magnification includes a template selection image, a template, and similarity distribution information. Numbers used for determining a matching position such as sizes and template coordinates are stored for each image. FIG. 18 is a case in which the template of each magnification occupies the same area. In this case, the offset of the template of any magnification other than the first magnification with respect to that the first magnification is always 0.

Figure 19:
FIG. 19 is a diagram showing another example (with an offset) of the confirmation screen of the registered template data set.

In contrast to FIG. 18, FIG. 19 shows a case in which the area held by the template of each magnification is different. In this case, the template of each magnification has an offset and similarity distribution information thereof seems as if to have been translated.

Normalized correlation maps have been used as similarity distribution information to describe the present invention. A normalized correlation can be calculated as shown below: For images $f(n_1, n_2)$ and $g(n_1, n_2)$ of the size $N_1 \times N_2$, if we set $$E_f = \frac{1}{N_1 \times N_2} \sum_{n_1 n_2} f(n_1, n_2)$$

the normalized correlation can be calculated as $$\frac{\sum_{n_1 n_2} (f(n_1, n_2) - Ef)(g(n_1, n_2) - Eg)}{\sqrt{\sum_{n_1 n_2} (f(n_1, n_2) - Ef)^2} \sqrt{\sum_{n_1 n_2} (g(n_1, n_2) - Eg)^2}}$$

where $0 \leq n_1 \leq N_1-1$ and $0 \leq n_2 \leq N_2-1$, and $$\sum_{n_1 n_2}$$

represents $$\sum_{n_1=0}^{N_1-1} \sum_{n_2=0}^{N_2-1}$$

$N_1 \times N_2$ is the template size. f and g are the template and target area.

Something other than the normalized correlation maps can also be used as similarity distribution information. For example, a phase limited correlation function can be used. The phase limited correlation function will be described below.

If the discrete Fourier transforms for images $f(n_1, n_2)$ and $g(n_1, n_2)$ (where $-N_1/2 \leq n_1 \leq (N_1/2)-1$ and $-N_2/2 \leq n_2 \leq (N_2/2)-1$) of the size $N_1 \times N_2$ are $F(k_1, k_2)$ and $G(k_1, k_2)$, F and G can be written as $$F(k_1, k_2) = \sum_{n_1 n_2} f(n_1, n_2) W_{N_1}^{k_1 n_1} W_{N_2}^{k_2 n_2} = A_F(k_1, k_2) e^{j\theta_F(k_1, k_2)}$$

$$G(k_1, k_2) = \sum_{n_1 n_2} g(n_1, n_2) W_{N_1}^{k_1 n_1} W_{N_2}^{k_2 n_2} = A_G(k_1, k_2) e^{j\theta_G(k_1, k_2)}$$

where $-N_1/2 \leq k_1 \leq (N_1/2)-1$ and $-N_2/2 \leq k_2 \leq (N_2/2)-1$.

$$W_{N_1} = e^{-j2\pi/N_1}, W_{N_2} = e^{-j2\pi/N_2}$$

and $$\sum_{n_1 n_2}$$

represent $$\sum_{n_1=-\frac{N_1}{2}}^{\frac{N_1}{2}-1} \sum_{n_2=-\frac{N_2}{2}}^{\frac{N_2}{2}-1}$$

$A_F(k_1, k_2)$ and $A_G(k_1, k_2)$ are amplitude components of $F(k_1, k_2)$ and $G(k_1, k_2)$ and $$e^{j\theta_F(k_1,k_2)}$$

$$e^{j\theta_G(k_1,k_2)}$$

are phase components.

A mutual spectrum can be written as $$R(k_1,k_2) = F(k_1,k_2)\overline{G(k_1,k_2)} = A_F(k_1,k_2) A_G(k_1,k_2) e^{j\theta(k_1,k_2)}$$

where $$\overline{G(k_1,k_2)}$$

is a complex conjugate of $G(k_1, k_2)$ and $\theta(k_1, k_2) = \theta_F(k_1, k_2) - \theta_G(k_1, k_2)$.

If $$\hat{R}(k_1,k_2)$$

is a mutual phase spectrum, $$\hat{R}(k_1,k_2)$$

can be written as $$\hat{R}(k_1, k_2) = \frac{F(k_1, k_2)\overline{G(k_1, k_2)}}{|F(k_1, k_2)\overline{G(k_1, k_2)}|} = e^{j\theta(k_1,k_2)}$$

An inverse discrete Fourier transform of $$\hat{R}(k_1,k_2)$$

is a phase limited correlation function $$\hat{r}(n_1,n_2)$$

and can be written as $$\hat{r}(n_1, n_2) = \frac{1}{N_1 N_2} \sum_{k_1 k_2} \hat{R}(k_1, k_2) W_{N_1}^{-k_1 n_1} W_{N_2}^{-k_2 n_2}$$

where $$\sum_{k_1 k_2}$$

means $$\sum_{k_1=-\frac{N_1}{2}}^{\frac{N_1}{2}-1} \sum_{k_2=-\frac{N_2}{2}}^{\frac{N_2}{2}-1}$$

Since f and g must have the same size, the template is enlarged to the same size as that of the search image.

Figure 20:
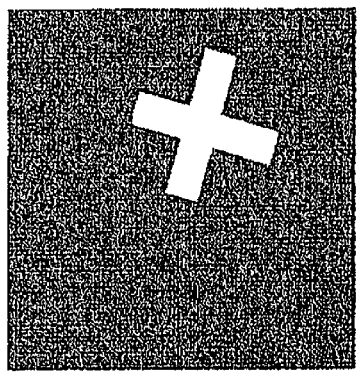
FIG. 20 is a conceptual diagram of a detection method of rotation and expansion/contraction between images.
Figure 20:
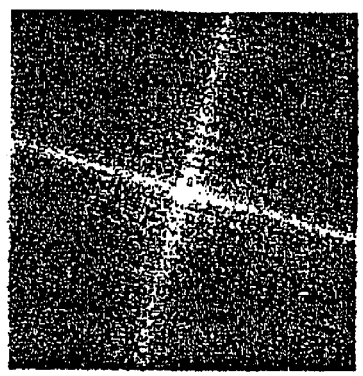
Figure 20:
Figure 20:
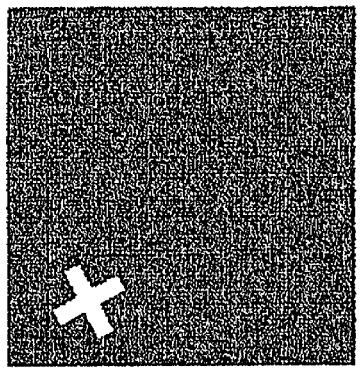
Figure 20:
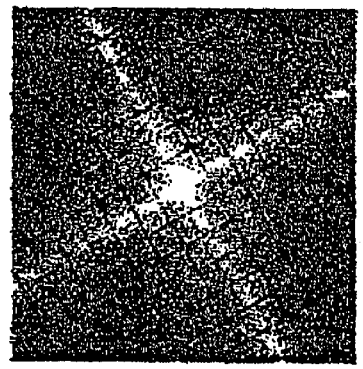
Figure 20:

If any rotation or expansion/contraction has occurred between the template selection image and search image, there is also a method of estimating a degree of rotation or expansion/contraction. Details can be found in "Algorithm for estimating magnification of electron microscope images based on the phase limited correlation method," by Sei Nagashima, Takafumi Aoki, and Ruriko Tsuneda, Shingaku Giho, SIP2005-42, pp. 19-24, June 2005. Here, an overview thereof is provided with reference to FIG. 20.

Amplitude spectra (b) and (b') of a template selection image (a) and a search image (a') will be calculated. Amplitude spectra are invariant with respect to translation of original images, only rotation or expansion/contraction will be reflected. If the log-polar transformation (after polar coordinate transformation, a logarithm is taken in the radial direction, (c) and (c')) is applied, rotation will be detected as an amount of translation of the x-axis and expansion/contraction as an amount of translation of the y-axis.

By estimating a degree of rotation or expansion/contraction and providing rotation or expansion/contraction information to the template and marginal similarity distribution information in accordance with the estimation, as described above, more reliable template matching can be expected. At this point, attention must be paid to an offset of the template.

What is claimed is:

1. An inspection apparatus performing template matching to a search image; comprising:
   a template cutout means for cutting out a template from a template selection image;
   a marginal similarity calculation means for calculating marginal similarity distribution information, which is a similarity distribution of the template selection image to the template;
   a search image similarity calculation part for calculating search image similarity distribution information, which is a similarity distribution of the search image to the template;
   a similarity distribution-to-similarity distribution similarity calculation means for calculating similarity distribution-to-similarity distribution similarity information between the marginal similarity distribution information and the search image similarity distribution information; and
   a matching position determination part for determining a matching position based on the similarity distribution-to-similarity distribution similarity.

2. The inspection apparatus according to claim 1, wherein the marginal similarity distribution information and the search image similarity distribution information are images having a similarity for each coordinate as a pixel value.

3. The inspection apparatus according to claim 2, wherein the marginal similarity distribution information and the search image similarity distribution information have lower resolution than the template selection image and the search image respectively, which are original images of each.

4. The inspection apparatus according to claim 2, wherein areas in which there is a high degree of similarity between the marginal similarity distribution information and the search image similarity distribution information are extended.

5. The inspection apparatus according to claim 1, wherein the marginal similarity distribution information and the search image similarity distribution information are a list of coordinate information and a degree of similarity of locations with a high degree of similarity.

6. The inspection apparatus according to claim 1, wherein when calculating the similarity distribution-to-similarity distribution similarity information, matching of locations with a high degree of similarity is determined with a predetermined width.

7. The inspection apparatus according to claim 1, wherein two images with a same field of vision and different noise for cutting out a template and calculating a marginal similarity distribution are used as the template selection images.

8. The inspection apparatus according to claim 1, further comprising a means for storing the template and the template selection image, or the template and the marginal similarity distribution by associating them.

9. The inspection apparatus according to claim 1, wherein the marginal similarity distribution information and the search image similarity distribution information are generated for each magnification from the template selection image and the search image, which are photographed under a plurality of magnifications, and a matching position is determined based on the above information.

10. The inspection apparatus according to claim 1, wherein if there are many locations where a high degree of similarity is found in the marginal similarity distribution, the selected template is determined to be inappropriate and a warning is issued.

11. The inspection apparatus according to claim 1, wherein if a rotation or expansion/contraction occurs between the template selection image and the search image, a degree thereof is detected and the template and the marginal similarity distribution are corrected in accordance with the degree.

12. An inspection apparatus performing template matching to a search image; comprising:
   a template cutout means for cutting out a template from a template selection image;
   a marginal similarity calculation means for calculating marginal similarity distribution information, which is a similarity distribution of the template selection image to the template;
   a matching prime candidate selection part for selecting and cutting out an area of the search image with a high degree of similarity to the template as a matching prime candidate;
   a search image similarity calculation part for calculating search image versus prime candidate similarity distribution information, which is a similarity distribution of the search image to the matching prime candidate;
   a similarity distribution-to-similarity distribution similarity calculation means for calculating similarity distribution-to-similarity distribution similarity information between the marginal similarity distribution information and the search image versus prime candidate similarity distribution information; and
   a matching position determination part for determining a matching position based on the similarity distribution-to-similarity distribution similarity.

13. The inspection apparatus according to claim 12, wherein the marginal similarity distribution information and the search image versus prime candidate similarity distribution information are images having a similarity for each coordinate as a pixel value.

14. The inspection apparatus according to claim 13, wherein the marginal similarity distribution information and the search image versus prime candidate similarity distribution information have lower resolution than the template selection image and the search image respectively, which are original images of each.

15. The inspection apparatus according to claim 13, wherein areas in which there is a high degree of similarity between the marginal similarity distribution information and the search image versus prime candidate similarity distribution information are extended.

16. The inspection apparatus according to claim 12, wherein the marginal similarity distribution information and the search image similarity distribution information are a list of coordinate information and a degree of similarity of locations with a high degree of similarity.

17. The inspection apparatus according to claim 12, wherein when calculating the similarity distribution-to-similarity distribution similarity information, matching of locations with a high degree of similarity is determined with a predetermined width.

18. The inspection apparatus according to claim 12, further comprising a means for storing the template and the template selection image or the template and the marginal similarity distribution by associating them.

19. The inspection apparatus according to claim 12, wherein the marginal similarity distribution information and the search image versus prime candidate similarity distribution information are generated for each magnification from the template selection image and the search image, which are photographed under a plurality of magnifications, and a matching position is determined based on the above information.

20. The inspection apparatus according to claim 12, wherein if there are many locations where a high degree of similarity is found in the marginal similarity distribution, the selected template is determined to be inappropriate and a warning is issued.

* * * * *